United States Patent

Hempowitz et al.

[19]
[11] Patent Number: 4,679,948
[45] Date of Patent: Jul. 14, 1987

[54] RADIATION PROBE FOR CONTACTLESS MEASUREMENT OF THE SURFACE TEMPERATURE OF AN OBJECT

[75] Inventors: Günter Hempowitz; Gustav Meyer-Kretschmer, both of Jülich, Fed. Rep. of Germany

[73] Assignee: Uranit GmbH, Jülich, Fed. Rep. of Germany

[21] Appl. No.: 796,099

[22] Filed: Nov. 7, 1985

[30] Foreign Application Priority Data

Dec. 14, 1984 [DE] Fed. Rep. of Germany ....... 3445677

[51] Int. Cl.$^4$ .................................................. G01J 5/12
[52] U.S. Cl. .................................... 374/129; 219/502; 374/164
[58] Field of Search ........................... 374/9, 129, 123; 250/515.1, 338.3, 352

[56] References Cited

U.S. PATENT DOCUMENTS

| | | | |
|---|---|---|---|
| 3,401,263 | 9/1968 | Birkebak | 374/9 |
| 3,924,469 | 12/1975 | Brandli et al. | 374/129 |
| 4,019,381 | 4/1977 | Elmer | 374/32 |
| 4,435,092 | 3/1984 | Iuchi | 250/338.3 X |
| 4,456,919 | 6/1984 | Tomita et al. | 374/126 X |

OTHER PUBLICATIONS

G. Seumel et al, "Bestimmung und Reglung der Temperatur von Metallbändern mit einem Strahlungsthermometer", Metall, vol. 26, No. 4, Apr. 1972, pp. 342-346.

*Primary Examiner*—Daniel M. Yasich
*Attorney, Agent, or Firm*—Spencer & Frank

[57] ABSTRACT

Radiation measuring probe for contactless measurement of the surface temperature of an object, independent of the emissivity of the object. The probe includes a radiation receiver and a housing having interior surfaces defining an interior space. The radiation receiver is disposed in the interior space, thermally insulated with respect to the housing. The housing includes a shield which has a shield surface facing outwardly so as to be towards a surface of an object whose surface temperature is to be measured. The shield has an aperture opening into the shield surface, communicating with the interior space and through which thermal radiation emanating from the object impinges on the radiation receiver. The shield surface is blackened and configured to correspond to the contour of the surface of the object, and the interior surfaces of the housing are of low emissivity. A regulatable heating mechanism is provided for regulating the temperature of the housing to correspond to the temperature of the radiation receiver, with the temperature at which correspondence occurs representing the surface temperature of the object.

3 Claims, 1 Drawing Figure

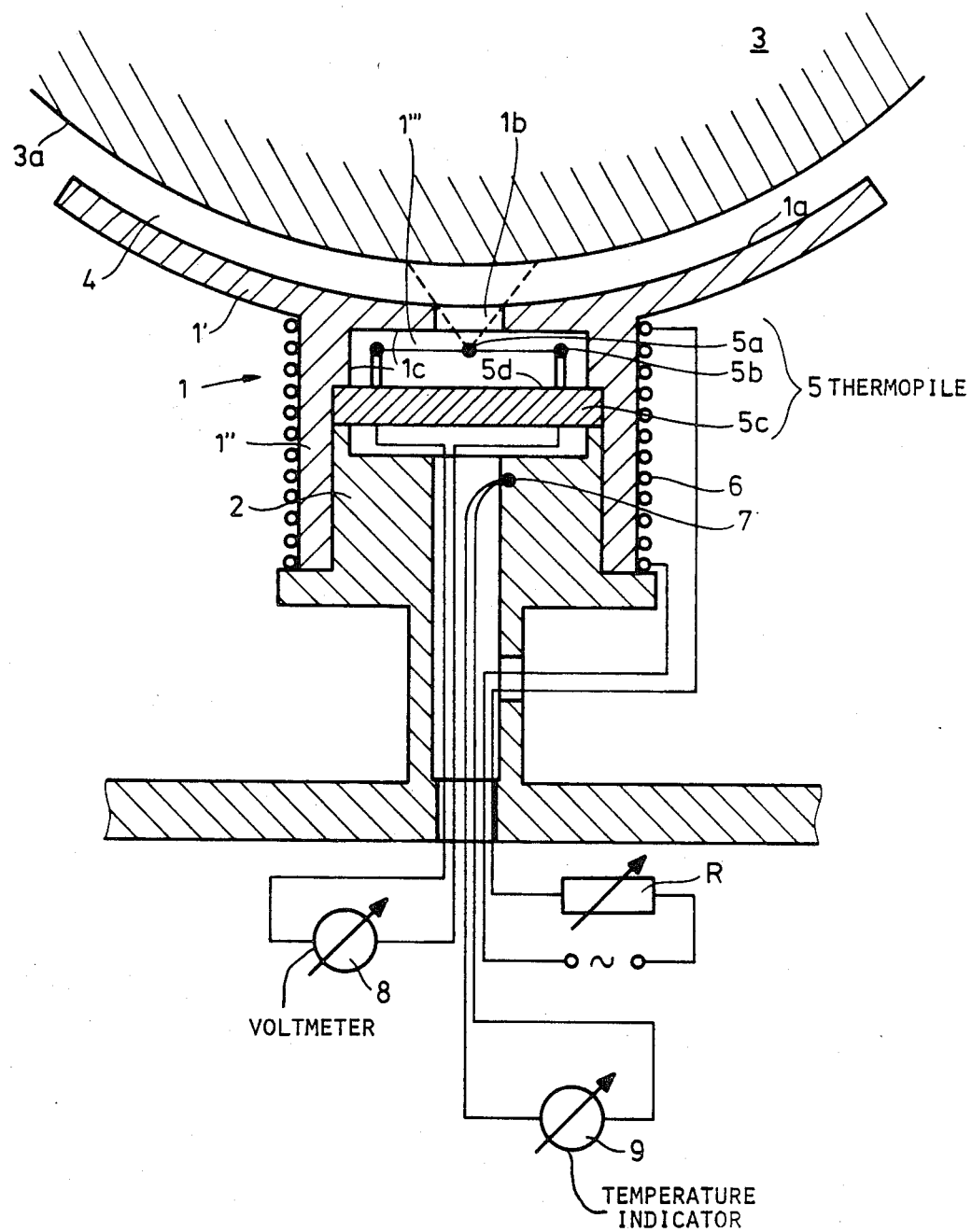

RADIATION PROBE FOR CONTACTLESS MEASUREMENT OF THE SURFACE TEMPERATURE OF AN OBJECT

BACKGROUND OF THE INVENTION

The present invention relates to a radiation measuring probe for contactless measurement of the surface temperature of an object, independent of the emissivity of the object.

A radiation measuring probe of this type is described by G. Seumel et al in "Bestimmung und Regelung der Temperatur von Metalländern mit einem Strahlungsthermometer" (Temperature Determinatin and Regulation of Metal Bands by Means of a Pyrheliometer) published in *Metall*, Volume 26, No. 4, April, 1972, pages 342-346. The shield of the probe described by Seumel et al has the shape of a hollow, polished hemisphere having an opening for passage of radiation from an object to a measuring probe. The shield is adapted to be placed over the object to be measured. The hemisphere is equipped with a heating coil and a thermocouple, with the temperature of the hemisphere being adjustable to the temperature indicated by the measuring probe. The temperature of the object being measured corresponds to the temperature at which the temperature indications of the hemisphere and measuring probe coincide. (See Seumel et al, supra, at page 343, FIG. 2 and the associated text.) In the foregoing arrangement, however, the hemisphere requires a relatively large distance between the object and the measuring probe, with the resulting disadvantage that temperatures of less than 200° C. cannot be measured with sufficient accuracy.

SUMMARY OF THE INVENTION

It is an object of the present invention to provide a radiation measuring probe of the foregoing type which is able to provide a highly accurate measurement of the surface temperature of an object between room temperature and about 200° C., independent of the emissity of the object.

The above and other objects are accomplished according to the invention by the provision of a radiation measuring probe for contactless measurement of the surface temperature of an object, independent of the emissivity of the object, the probe including: a radiation receiver; a housing having interior surfaces defining an interior space, the radiation receiver being disposed in the interior space and thermally insulated with respect to the housing, the housing including a shield which has a shield surface facing outwardly so as to be towards a surface of an object whose surface temperature is to be measured, the shield having an aperture opening into the shield surface, communicating with the interior space and through which thermal radiation emanating from the object impinges on the radiation receiver, the shield surface being blackened and configured to correspond to the contour of the surface of the object, and the interior surfaces of the housing being of low emissivity; and a regulatable heating means for regulating the temperature of the housing to correspond to the temperature of the radiation receiver, the temperature at which correspondence occurs, representing the surface temperature of the object.

By adapting the shield to the geometry of the object to be measured, the distance from the radiation receiver of the probe can be kept relatively short so that the measured radiation intensity is correspondingly high. The blackening of the side of the shield facing the object and the short distance from the object being measured have the result that interfering ambient radiation is completely absorbed before it reaches the radiation sensitive region of the measuring probe, while the interior walls of low emissivity of the probe housing surrounding the radiation receiver substantially prevent radiation feedback between the latter and the walls of the probe housing. The present invention is particularly suitable for measuring the surface temperature of moving metallic objects, such as rotors and shafts, which have low emissivity. The probe according to the invention operates almost independently of the magnitude of the emissivity of the surface of the object to be measured.

One embodiment of the invention will be described in greater detail below with reference to the drawing.

BRIEF DESCRIPTION OF THE DRAWING

The sole drawing FIGURE is a schematic sectional view of a radiation measuring probe according to the invention in operative relation to a rotating metal cylinder whose surface temperature is to be measured.

DESCRIPTION OF THE PREFERRED EMBODIMENT

Referring to the FIGURE, there is shown a probe housing 1 composed of a shield 1' and a base 2. The shield 1' is positioned adjacent a cylinder 3 having a surface 3a whose temperature is to be measured. Shield 1' has a projection 1" which engages and cooperates with base 2 to define a housing interior 1'" in which a thermopile 5 is disposed. Shield 1' presents a blackened, cylindrical bowl surface 1a which faces cylinder 3 and which is spaced from surface 3a to define a narrow annular gap 4. Bowl surface 1a may be blackened, for example, with any commercially available heat resistant paint of high absorptivity. In the center of the bowl, shield 1' has a slit-shaped aperture 1b through which passes thermal radiation emanating from surface 3a to impinge on a center strip 5a of thermopile 5. Center strip 5a serves as a radiation receiver in the interior 1'" of probe housing 1. A reference strip 5b of thermopile 5 lies in a region shielded against thermal radiation and is connected with probe housing 1 in a highly heat conducting manner via a base plate 5c of thermopile 5.

Center strip 5a is mounted in a known manner so that there is low thermal conduction between strips 5a and 5b. Strips 5a and 5b are connected to a voltage meter 8 and if strips 5a and 5b have different temperatures, a thermoelectric difference voltage $\Delta T$ is indicated by voltage meter 8. The voltage difference $\Delta T$ is utilized to regulate, via a regulator R, an electrical heating element, which could be in the form of a heating coil 6, surrounding housing 1. The thermal energy is now regulated in such a manner that thermoelectric difference voltage $\Delta T$ is reduced to zero. A temperature sensor 7 mounted on base 2 and connected across a temperature indicating device 9 is used to measure the temperature T of the probe housing 1, this latter temperature corresponding to the temperature of the surface 3a of cylinder 3.

The width of annular gap 4, that is the space between bowl surface 1a of shield 1' and surface 3a of cylinder 3, is selected so that interfering, extraneous, ambient radiation is reflected several times and is thereby completely absorbed by the blackened bowl surface 1a. Interior space 1''' is defined by an interior surface 1c of shield 1' and a surface 5d of plate 5c.

The sensitivity of the probe depends on the difference of heat transfer from surface 3a to measuring strip 5a and heat transfer from strip 5a to the interior space 1''' and the strip 5b. The lower the latter stream is, the higher is the temperature difference—the higher is the thermoelectric voltage indicated by voltage meter 8. To minimize this heat transfer, the surfaces 1c and 5d are coated with a material of low emissivity, thus reducing heat transfer by thermal radiation, and the thermopile material has to be as thin as possible to reduce heat transfer between strips 5a and 5b by thermal conductivity.

Shield 1' and base 2 are releasably connected together. In order to adapt to different geometries of objects to be measured, shield 1' may be exchanged for other shield shapes adapted to the respective surface configuration of a particular object in question.

Compared to direct thermocouple measurements in a range between room temperature and about 200° C., measurements made with the above-described radiation measuring probe are accurate to with ±0.5° C.

It will be understood that the above description of the present invention is susceptible to various modifications, changes and adaptions and the same are intended to be comprehended within the meaning and range of equivalents of the appended claims.

We claim:

1. Radiation measuring probe for contactless measurement of the surface temperature of an object, independent of the emissivity of the object, comprising:
   a radiation receiver;
   a housing having interior surfaces defining an interior space, said radiation receiver being disposed in said interior space and thermally insulated with respect to said housing, said housing being formed of a plurality of members including a shield member having a shield surface facing outwardly so as to be towards a surface of the object whose surface temperature is to be measured and a base member, said shield member having an aperture opening into said shield surface, communicating with the interior space and through which thermal radiation emanating from the object impinges on said radiation receiver, said shield surface being blackened so as to absorb interfering ambient radiation and being configured to correspond to the contour of the surface of the object to be measured, and said interior surfaces of said housing being of low emissivity; and
   a regulatable heating means for regulating the temperature of said housing to correspond to the temperature of said radiation receiver, with the temperature at which correspondence occurs representing the surface temperature of the object.

2. Radiation measuring probe as defined in claim 1, wherein said member shield is releasably connected with said base member.

3. A radiation measuring probe as defined in claim 1 wherein: said radiation receiver is the measuring strip of a thermopile disposed in said interior space; said thermopile further includes a reference strip, which is positioned in said interior space such that it is shielded from thermal radiation entering said interior space via said opening and so that it is responsive to the temperature of said housing; and means are provided for measuring the voltage across said thermopile.

* * * * *